UNITED STATES PATENT OFFICE.

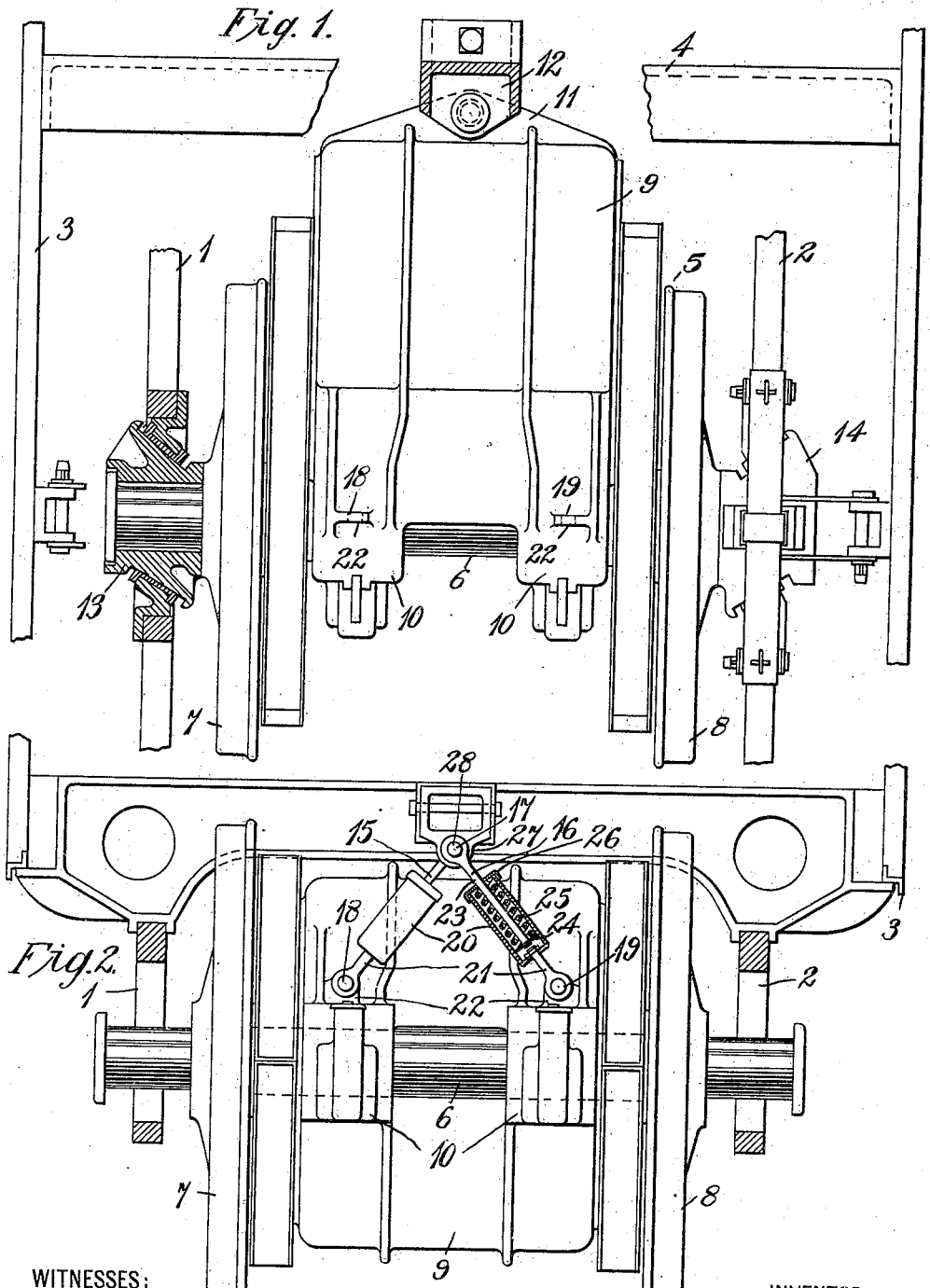

CHARLES A. PSILANDER, OF PITTSBURG, PENNSYLVANIA, ASSIGNOR TO WESTINGHOUSE ELECTRIC AND MANUFACTURING COMPANY, A CORPORATION OF PENNSYLVANIA.

SUSPENSION MEANS FOR ELECTRIC MOTORS.

981,795.  Specification of Letters Patent.  Patented Jan. 17, 1911.

Application filed May 16, 1910. Serial No. 561,741.

*To all whom it may concern:*

Be it known that I, CHARLES A. PSILANDER, a citizen of the United States, and a resident of Pittsburg, in the county of Allegheny and State of Pennsylvania, have invented a new and useful Improvement in Suspension Means for Electric Motors, of which the following is a specification.

My invention relates to electric vehicles and particularly to electric locomotives and such other vehicles as are provided with motor-operated pony trucks having limited swiveling adjustments.

The object of my invention is to provide simple and effective means for relieving the driving axle of a pony truck, of the class above indicated, from the weight of the driving motor, which means shall also serve to center the truck and thereby avoid the necessity for independent apparatus for effecting this result.

It has been proposed to so associate an electric driving motor with a pony truck, which is capable of swiveling adjustment, that the motor frame shall constitute a radius structure. According to this arrangement, the motor is provided with the usual axle bearings, at one end, and is pivotally secured, at its opposite end, to a transom or some other part of the locomotive frame. With this arrangement, it is usual to yieldingly support the motor frame from points in the vehicle body directly above the driving axle, in order that the axle bearings may be relieved from the weight of the motor.

According to my present invention, I provide yielding means for accomplishing the above mentioned purpose which, at the same time, is adapted to center the swiveling truck and thus make it better able to lead the locomotive of which it forms a part.

Figure 1 of the accompanying drawings is a plan view, partially in section, of a motor-driven pony truck, to which my invention may be applied, and Fig. 2 is a front elevation of the truck shown in Fig. 1, means being provided for centering the truck and relieving the axle of the motor weight.

Referring to the drawings, the vehicle section here shown comprises side frames 1 and 2, a body 3, a transom 4 and a motor-driven pony truck 5. The truck 5 comprises a driving axle 6, wheels 7 and 8, an electric driving motor 9, having bearings 10, which surround the axle 6, and a nose projection 11 which is pivotally secured to a projection 12 on the transom 4. The axle 6 sustains a portion of the weight of the vehicle, the side frames 1 and 2 being provided with bearing housings 13 and 14 that are so supported as to permit a limited swiveling adjustment of the pony truck. A portion of the weight of the motor is obviously carried by the vehicle body by reason of the connection between the motor nose and the transom 4.

In order that the axle 6 may be relieved from any portion of the weight of the motor, yielding suspension rods 15 and 16 are pivotally secured to a point 17 in the central plane of the vehicle body at one end and to points 18 and 19 of the motor frame. The points 18 and 19 are directly above the axle 6 and are laterally spaced some distance apart in order that the suspension rods may not only take the weight of the motor, but may also tend to center the pony truck. Each of the rods 15 and 16 comprises a cylinder or box 20 which is secured, by an eye bolt 21 or other suitable means, to a bifurcated lug 22 of the motor frame, a rod or bar 23 having an enlargement or washer 24 at one end and a spring 25 which is located in the box 20, between the washer 24 and a cap 26. The rod 23 is preferably provided with an eye at its outer end and is secured to a projection 27 of the vehicle body by means of a pin 28. The arrangement of parts is such that the weight of the motor is carried by the yielding rods, without producing an upward pressure upon the under side of the axle. Since the yielding rods are spread apart at their lower ends, where they are attached to the swivel truck, they obviously tend to center the truck whenever it is thrown to one side or the other by curves in the track. The yielding rods may be replaced by any other suitable yielding connection which is adapted to accomplish the same results, and I desire that the scope of my invention shall be limited only as specified in the appended claims.

I claim as my invention:

1. In a vehicle, the combination with a truck capable of a swiveling adjustment and an electric driving motor therefor, of a single means for supporting the weight of the motor and for centering the truck.

2. In a vehicle, the combination with a pony truck capable of a limited swiveling adjustment and an electric driving motor therefor, of yielding suspension rods which are secured at one end to the vehicle body and are so secured at their opposite ends to the motor frame as to center the truck.

3. In a vehicle, the combination with a pony truck capable of a limited swiveling adjustment and an electric driving motor therefor, of a pair of yielding suspension bars pivotally secured to the body of the vehicle at a single point in its central plane and pivotally connected, at their opposite ends, to widely separated points on the motor frame, whereby the weight of the motor is borne by the vehicle body and the truck is centered.

In testimony whereof, I have hereunto subscribed my name this 29th day of April, 1910.

CHARLES A. PSILANDER.

Witnesses:
  EDWIN TIDLUND,
  B. B. HINES.